(12) United States Patent
Dou et al.

(10) Patent No.: US 6,476,985 B2
(45) Date of Patent: Nov. 5, 2002

(54) IMAGE PICKUP LENS UNIT

(75) Inventors: Satoshi Dou, Tsurugashima; Toshiyuki Yoshida, Machida, both of (JP)

(73) Assignee: Milestone Co., Ltd., Tokyo (JP)

( * ) Notice: Subject to any disclaimer, the term of this patent is extended or adjusted under 35 U.S.C. 154(b) by 0 days.

(21) Appl. No.: 09/886,595

(22) Filed: Jun. 21, 2001

(65) Prior Publication Data

US 2001/0055164 A1 Dec. 27, 2001

Related U.S. Application Data

(63) Continuation-in-part of application No. 09/746,589, filed on Dec. 21, 2000.

(30) Foreign Application Priority Data

Jun. 27, 2000 (JP) ........................................ 2000-192865
Apr. 25, 2001 (JP) ........................................ 2001-127622

(51) Int. Cl.[7] .............................. G02B 7/02; G02B 12/22
(52) U.S. Cl. ...................................... 359/823; 359/693
(58) Field of Search ................................ 359/819, 823, 359/825, 693, 694, 699, 700, 701, 705, 703; 353/100; 396/529

(56) References Cited

U.S. PATENT DOCUMENTS 5,117,311 A * 5/1992 Nomura ....................... 359/819

* cited by examiner

Primary Examiner—Loha Ben
Assistant Examiner—Saeed H Seyrafi
(74) Attorney, Agent, or Firm—Koda & Androlia

(57) ABSTRACT

An image pickup lens unit includes, as viewed from an object side, a retainer having an aperture stop, an image pickup lens, and a holder. The retainer having an aperture stop and the image pickup lens are united with each other. The holder assumes a substantially cylindrical shape and accommodates the image pickup lens such that the image pickup lens is united with the holder in a manner movable in relation to the holder, whereby movement of the retainer having an aperture stop causes the image pickup lens to move in relation to the holder to thereby carry out focus adjustment.

3 Claims, 8 Drawing Sheets

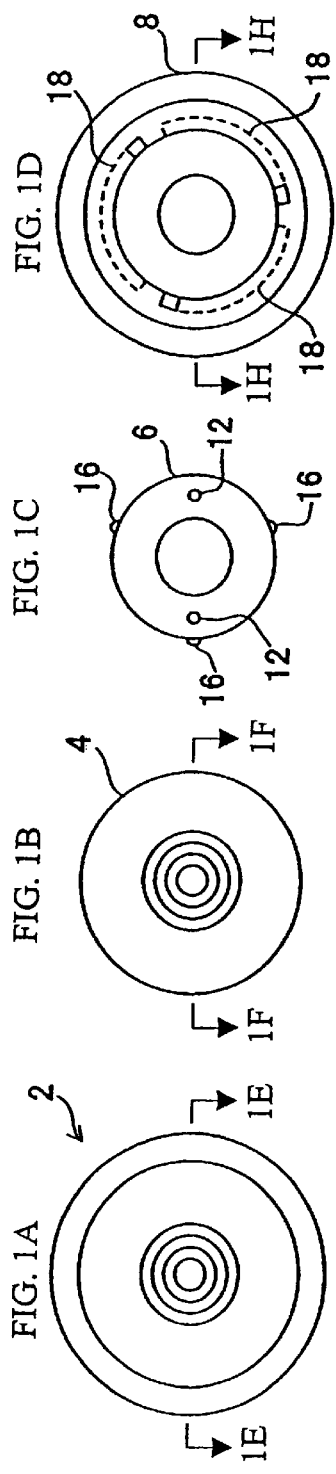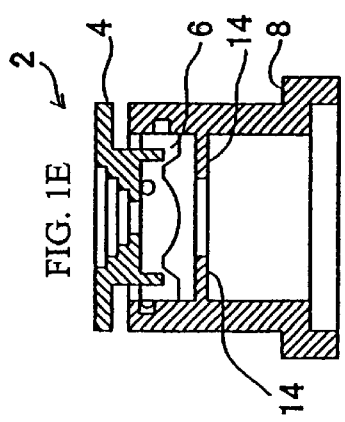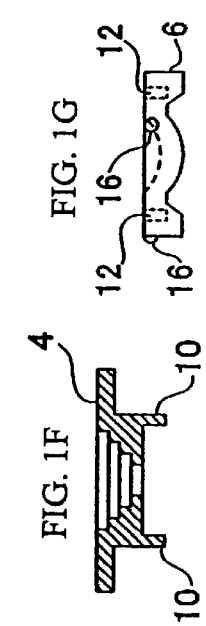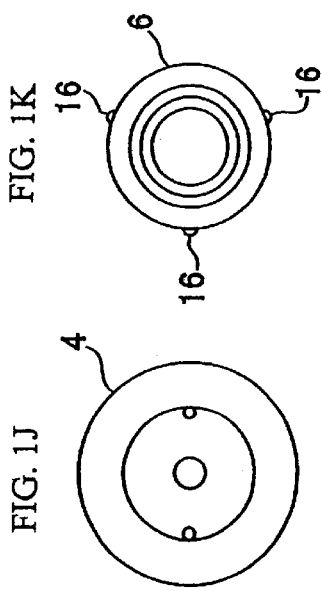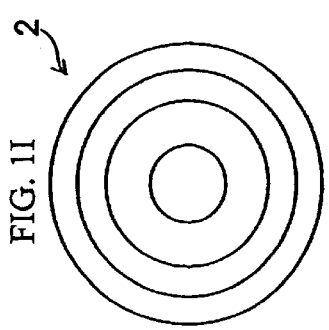

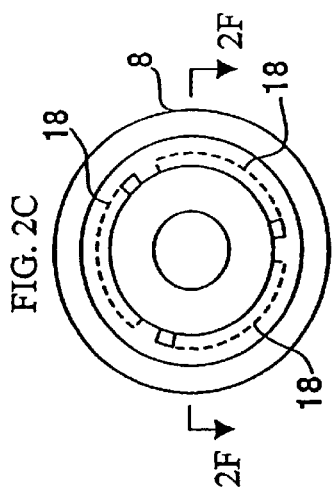
FIG. 2C
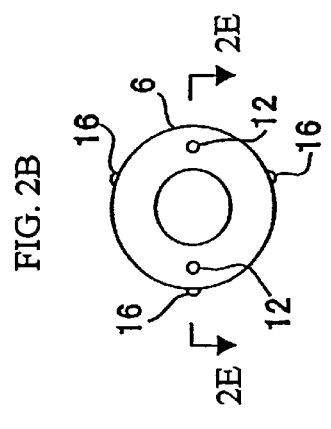
FIG. 2B
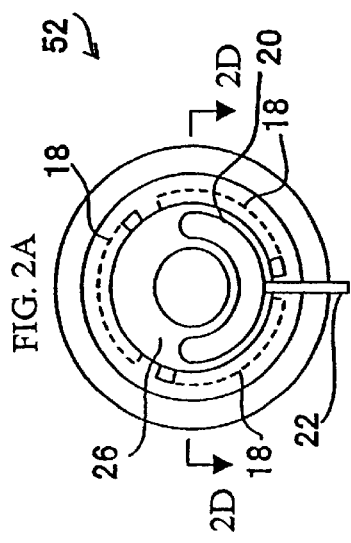
FIG. 2A
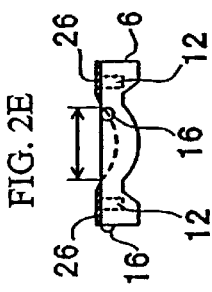
FIG. 2E
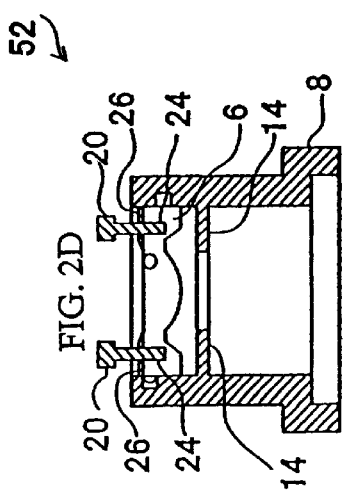
FIG. 2D
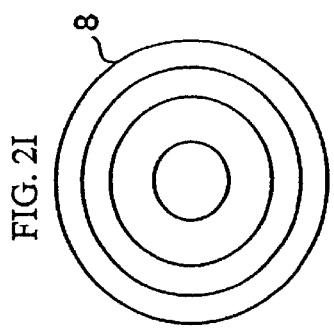
FIG. 2F
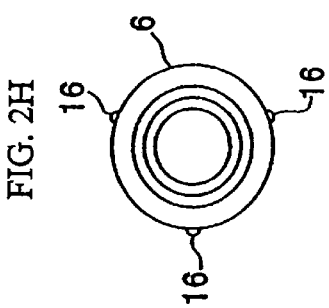
FIG. 2H
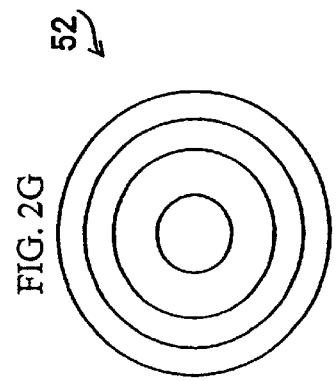
FIG. 2I
FIG. 2G

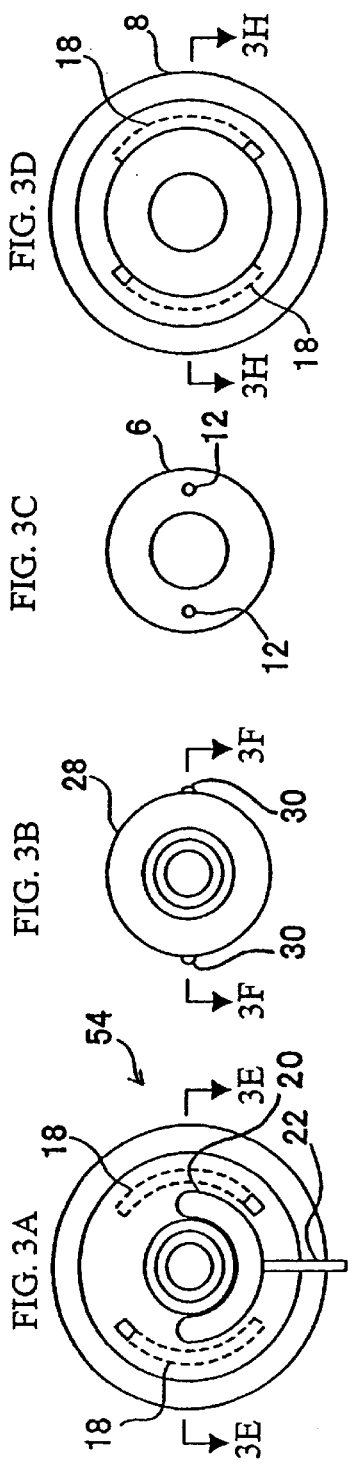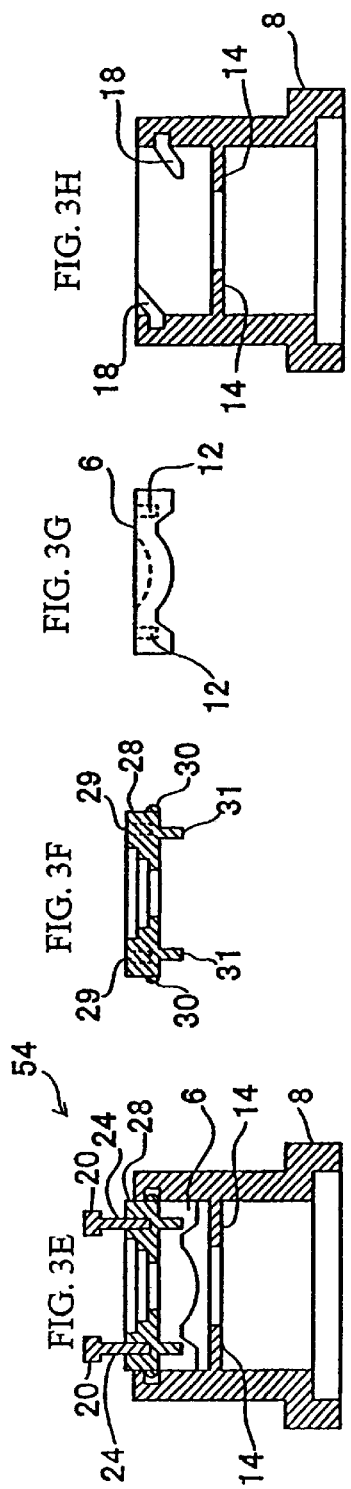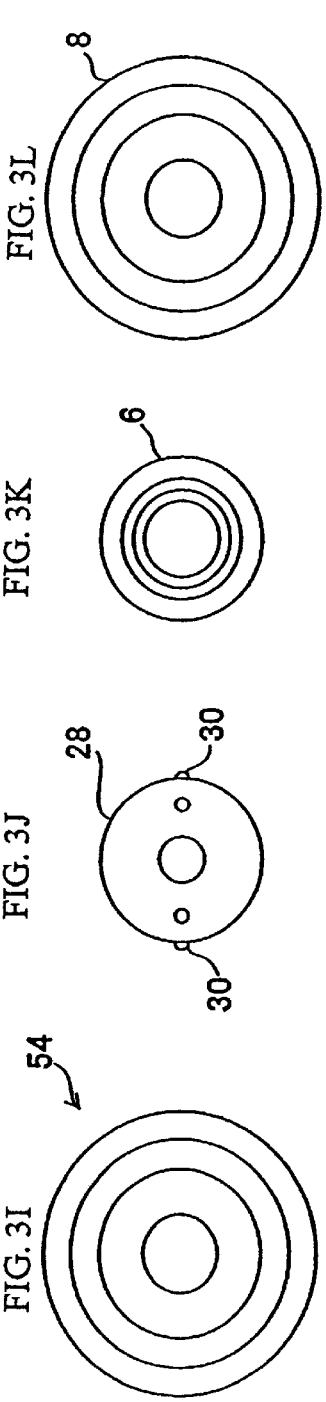

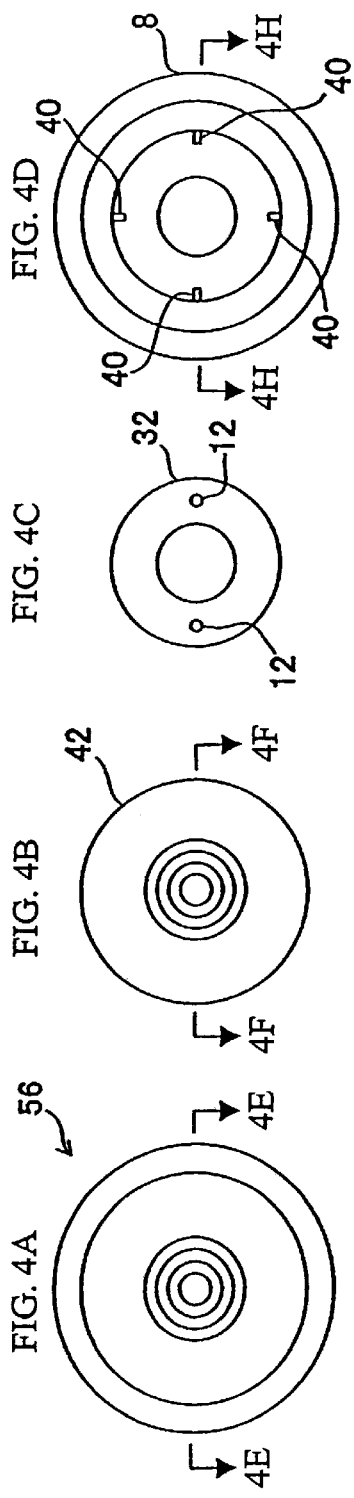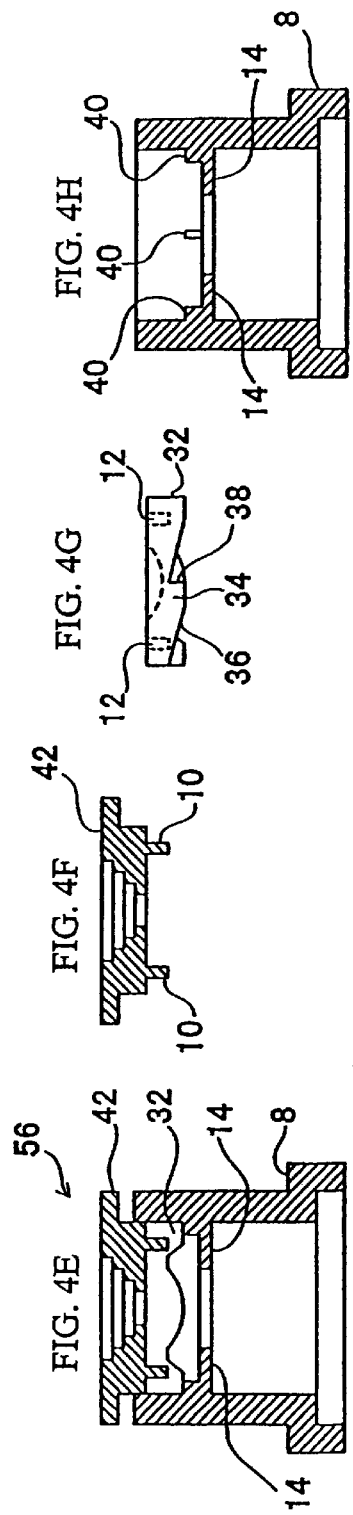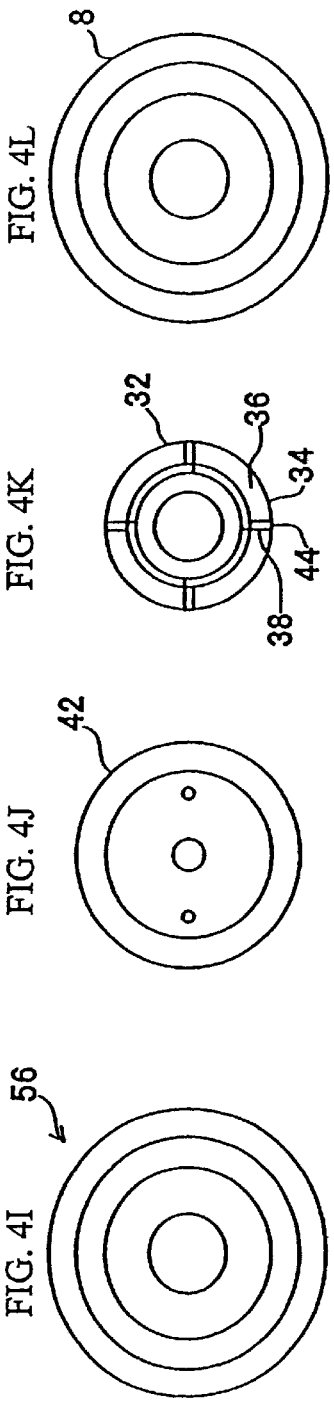

IMAGE PICKUP LENS UNIT

This is a Continuation-In-Part application of application Ser. No. 09/746,589, filed Dec. 21, 2000.

BACKGROUND OF THE INVENTION

1. Field of the Invention

The present invention relates to an image pickup lens unit. More particularly, the invention relates to an image pickup lens unit for use with a small-sized CCD or CMOS, which serves as an image pickup element, and which enables an image pickup lens to be united with a holder without being incorporated into a barrel.

2. Description of the Related Art

Conventionally, as shown in FIG. 6, an image pickup lens unit for use with a CCD or CMOS is composed of at least five components; namely, a lens barrel, a lens retainer, an image pickup lens, a stop, and a holder. However, it has been possible to freely perform focus adjustment of the image pickup lens after assembly thereof.

In recent years, there has been a demand for very significant reductions in both the size and cost of electronic camera equipment. In this environment, the image pickup lens unit for cameras are required to reduce the number of components, size, and cost. Particularly, there has been a movement to unify the holder and the lens in the monitor lens unit used in mobile equipment or cellular phones in order to accommodate the trend towards reductions in the size and cost of such equipment.

In order to meet the above requirement, an united-type image pickup lens unit has been devised in which a lens is fitted into a holder, for use in electronic camera equipment employing a solid image pickup element. The image pickup lens unit is composed of three components; namely, a retainer having an aperture stop, an image pickup lens, and a holder. Alternatively, the lens surface is subjected to printing so as to form an aperture stop, instead of using a retainer having an aperture stop. Therefore, the image pickup lens unit is composed of two components; namely, an image pickup lens and a holder, thereby realizing low cost through simplified assembly and a reduction in the number of components. Since the number of components is small, such an image pickup lens unit can be easily assembled and is therefore suitable for mass production.

However, since the above image pickup lens unit employing a united lens-and-holder structure does not have a focusing mechanism after assembly, maintaining high standards of manufacturing accuracy of respective components and the attachment accuracy of a CCD or CMOS are very important in terms of image quality. Specifically, the shorter the focal distance of the image pickup lens unit, the more important the distance of the image pickup lens and an image plane, as of a CCD or CMOS, becomes in terms of image quality. Since an image pickup lens for use with the above-mentioned image pickup element employs high brightness; specifically Fno=2.0–2.8, the focal depth becomes shallow. As a result, even a minor error in lens position causes defocus. In other words, since manufacturing errors of the respective components cause a variation in the design distance to an object, defocus will occur even when the distance to an object is set to the design distance in the course of mass production, resulting in poor image quality or an unfocused image.

Furthermore, an machining error of an image pickup lens, a contraction error of an image pickup lens in the course of molding, or a holder dimensional error, for example, will cause a defect in the final image. Accordingly, even when the united lens-and-holder structure is employed in an attempt to reduce cost and weight and in an attempt to facilitate mass production, defects will frequently result unless a focusing mechanism is employed, so that the costs increase undesirably, and mass production becomes difficult.

SUMMARY OF THE INVENTION

In view of growing demands for inexpensive high-performance lenses so as to be compatible with electronic image pickup equipment which is undergoing reduction in size and weight, an object of the present invention is to provide a small-sized, inexpensive, high-performance image pickup lens unit.

More particularly, an object of the present invention is to provide a high-performance image pickup lens unit for use with electronic image pickup equipment, enabling an image pickup lens and a holder to be united with each other through, for example, fitting, so as to avoid use of a barrel—which is conventionally used to hold and adjust the lens—for reduction in weight and costs, and enabling focusing after assembly.

Herein, an assembly obtained through incorporation of an image pickup lens into a peripheral component (a holder, for example) is called an "image pickup lens unit."

A first aspect of the present invention provides an image pickup lens unit comprising, as viewed from an object side, a retainer having an aperture stop, an image pickup lens, and a holder. The retainer and the image pickup lens are united with each other. The holder assumes a substantially cylindrical shape and accommodates the image pickup lens such that the image pickup lens is united with the holder in a manner movable in relation to the holder, whereby movement of the retainer causes the image pickup lens to move in relation to the holder to thereby carry out focus adjustment.

According to the first aspect, movement of the retainer having an aperture stop causes the image pickup lens to move, since the image pickup lens is united with the retainer. The image pickup lens moves while being accommodated within the holder, thereby maintaining a state in which the image pickup lens is united with the holder. Through movement of the image pickup lens, the image pickup lens is focused.

A second aspect of the present invention provides an image pickup lens unit comprising, as viewed from an object side, a retainer having an aperture stop and assuming a circular cross section, an image pickup lens assuming a circular cross section, and a holder assuming a circular cross section. The retainer and the image pickup lens are united with each other. At least one protrusion is formed on a circumferential portion of the image pickup lens. The holder assumes a substantially cylindrical shape and has an elongated groove formed on an inner cylindrical wall thereof in such a manner that the groove extends in the circumferential direction and inclines in the axial direction. The holder accommodates the image pickup lens such that the protrusion is fitted into the elongated groove to thereby unite the image pickup lens with the holder in a manner movable along the elongated groove in relation to the holder, whereby rotation of the retainer causes the image pickup lens to move along the elongated groove in relation to the holder, thereby moving the image pickup lens axially so as to carry out focus adjustment.

According to the second aspect, when the retainer having an aperture stop is rotated, the image pickup lens rotates and moves, since the image pickup lens is united with the retainer. The protrusion formed on the circumferential portion of the image pickup lens is fitted into the elongated groove, which is formed on the inner cylindrical wall of the holder. Accordingly, as the image pickup lens rotates, the protrusion moves along the elongated groove, which inclines in the axial direction of the holder; as a result, the image pickup lens moves axially. The image pickup lens moves rotatively while being accommodated within the holder, thereby maintaining a state in which the image pickup lens is united with the holder. Through axial movement of the image pickup lens, the image pickup lens is focused.

A third aspect of the present invention provides an image pickup lens unit comprising, as viewed from an object side, an image pickup lens assuming a circular cross section; and a holder assuming a circular cross section. The surface of the image pickup lens which faces an object, the surface of the image pickup lens which faces an image plane, or both of the surfaces are subjected to printing at a peripheral portion(s) thereof so as to form an aperture stop. At least one protrusion is formed on a circumferential portion of the image pickup lens. The holder assumes a substantially cylindrical shape and has an elongated groove formed on an inner cylindrical wall thereof in such a manner that the groove extends in the circumferential direction and inclines in the axial direction. The holder accommodates the image pickup lens such that the protrusion is fitted into the elongated groove to thereby unite the image pickup lens with the holder in a manner movable along the elongated groove in relation to the holder, whereby rotation of the image pickup lens causes the image pickup lens to move along the elongated groove in relation to the holder, thereby moving the image pickup lens axially so as to carry out focus adjustment.

According to the third aspect, the protrusion formed on the circumferential portion of the image pickup lens is fitted into the elongated groove, which is formed on the inner cylindrical wall of the holder. Accordingly, as the image pickup lens rotates, the protrusion moves along the elongated.groove, which inclines in the axial direction of the holder; as a result, the image pickup lens moves axially. The image pickup lens moves rotatively while being accommodated within the holder, thereby maintaining a state in which the image pickup lens is united with the holder. Through axial movement of the image pickup lens, the image pickup lens is focused.

A fourth aspect of the present invention provides an image pickup lens unit comprising, as viewed from an object side, a retainer having an aperture stop and assuming a circular cross section, an image pickup lens assuming a circular cross section, and a holder assuming a circular cross section. The retainer and the image pickup lens are united with each other. At least one protrusion is formed on a circumferential portion of the retainer. The holder assumes a substantially cylindrical shape and has an elongated groove formed on an inner cylindrical wall thereof in such a manner that the groove extends in the circumferential direction and inclines in the axial direction. The holder accommodates the image pickup lens such that the protrusion is fitted into the elongated groove to thereby unite the retainer with the holder in a manner movable along the elongated groove in relation to the holder, whereby rotation of the retainer causes the image pickup lens to move along the elongated groove in relation to the holder, thereby moving the image pickup lens axially so as to carry out focus adjustment.

According to the fourth aspect, when the retainer having an aperture stop is rotated, the image pickup lens rotates and moves, since the image pickup lens is united with the retainer. The protrusion formed on the circumferential portion of the retainer is fitted into the elongated groove, which is formed on the inner cylindrical wall of the holder. Accordingly, as the retainer rotates, the protrusion moves along the elongated groove, which inclines in the axial direction of the holder; as a result, the retainer moves axially, and thus the image pickup lens moves axially. The image pickup lens moves rotatively while being accommodated within the holder, thereby maintaining a state in which the image pickup lens is united with the holder. Through axial movement of the image pickup lens, the image pickup lens is focused.

A fifth aspect of the present invention provides an image pickup lens unit comprising, as viewed from an object side, a retainer having an aperture stop and assuming a circular cross section, an image pickup lens assuming a circular cross section, and a holder assuming a circular cross section. The retainer and the image pickup lens are united with each other. At least two toothlets are formed on a peripheral portion of a surface of the image pickup lens which faces an image plane, such that upper faces thereof have sloped surfaces formed along the circumference of the image pickup lens. The holder assumes a substantially cylindrical shape and has at least two protrusions formed on an inner cylindrical wall thereof so as to hold the image pickup lens through contact between the protrusions and the upper faces of the toothlets. The holder accommodates the image pickup lens such that the image pickup lens can move in relation to the holder while contact between the protrusions and the sloped surfaces of the upper faces of the toothlets is maintained, whereby rotation of the retainer causes the image pickup lens to move while maintaining contact of the sloped surfaces with the protrusions, thereby moving the image pickup lens axially so as to carry out focus adjustment.

According to the fifth aspect, when the retainer having an aperture stop is rotated, the image pickup lens rotates and moves, since the image pickup lens is united with the retainer. The image pickup lens is held within the holder such that the upper faces of the toothlets, which are formed on a peripheral portion of the surface of the image pickup lens which faces an image plane, are in contact with the protrusions formed on the inner cylindrical wall of the holder. Rotation of the retainer causes the image pickup lens to move rotatively while contact between the protrusions and the sloped surfaces of the upper faces is maintained. Since the upper faces of the toothlets have sloped surfaces sloping along the circumference direction, the image pickup lens rotates while maintaining contact between the protrusions and the upper faces of the toothlets. Therefore, the image pickup lens rotates in accordance with the shape of the sloped surfaces of the upper faces of the toothlets; as a result, the image pickup lens moves axially. The image pickup lens moves rotatively while being accommodated within the holder, thereby maintaining a state in which the image pickup lens is united with the holder. Through axial movement of the image pickup lens, the image pickup lens can be focused.

A sixth aspect of the present invention provides an image pickup lens unit comprising, as viewed from an object side, a retainer having an aperture stop and assuming a circular cross section, an image pickup lens assuming a circular cross section, and a holder assuming a circular cross section. The retainer having an aperture stop and the image pickup lens are united with each other. The holder assumes a substantially cylindrical shape in order to accommodate the image pickup lens and has at least one protrusion formed on an inner cylindrical wall of the holder. The image pickup lens has an elongated groove formed on a circumferential portion of the image pickup lens in such a manner that the groove extends in the circumferential direction and inclines in the axial direction. The image pickup lens is united with the holder in such a manner that the protrusion is fitted into the elongated groove to thereby enable the image pickup lens to move along the elongated groove in relation to the holder. Rotation of the retainer having an aperture causes the image pickup lens to move along the elongated groove in relation to the holder, thereby moving the image pickup lens axially so as to carry out focus adjustment.

According to the sixth aspect, when the retainer having an aperture stop is rotated, the image pickup lens rotates and moves, since the image pickup lens is united with the retainer. The protrusion formed on the inner cylindrical wall of the holder is fitted into the elongated groove formed on the circumferential portion of the image pickup lens. Accordingly, as the image pickup lens rotates, the protrusion. relatively moves along the elongated groove, which inclines in the axial direction of the holder; as a result, the image pickup lens moves axially. The image pickup lens moves rotatively while being accommodated within the holder, thereby maintaining a state in which the image pickup lens is united with the holder. Through axial movement of the image pickup lens, the image pickup lens is focused.

A seventh aspect of the present invention provides an image pickup lens unit comprising, as viewed from an object side, an image pickup lens assuming a circular cross section and a holder assuming a circular cross section. A surface of the image pickup lens which faces an object, a surface of the image pickup lens which faces an image plane, or both of the surfaces are subjected to printing at a peripheral portion(s) of the image pickup lens so as to form an aperture stop. The holder assumes a substantially cylindrical shape in order to accommodate the image pickup lens and has at least one protrusion formed on an inner cylindrical wall of the holder. The image pickup lens has an elongated groove formed on a circumferential portion of the image pickup lens in such a manner that the groove extends in the circumferential direction and inclines in the axial direction. The image pickup lens is united with the holder in such a manner that the protrusion is fitted into the elongated groove to thereby enable the image pickup lens to move along the elongated groove in relation to the holder. Rotation of the image pickup lens causes the image pickup lens to move along the elongated groove in relation to the holder, thereby moving the image pickup lens axially so as to carry out focus adjustment.

According to the seventh aspect of the prevent invention, the protrusion formed on the inner cylindrical wall of the holder is fitted into the elongated groove formed on the circumferential portion of the image pickup lens. Accordingly, as the image pickup lens rotates, the protrusion relatively moves along the elongated groove, which inclines in the axial direction of the holder; as a result, the image pickup lens moves axially. The image pickup lens moves rotatively while being accommodated within the holder, thereby maintaining a state in which the image pickup lens is united with the holder. Through axial movement of the image pickup lens, the image pickup lens is focused.

An eighth aspect of the present invention provides an image pickup lens unit comprising, as viewed from an object side, a retainer having an aperture stop and assuming a circular cross section, an image pickup lens assuming a circular cross section, and a holder assuming a circular cross section. The retainer having an aperture stop and the image pickup lens are united with each other. The holder assumes a substantially cylindrical shape in order to accommodate the image pickup lens and has at least one protrusion formed on an inner cylindrical wall of the holder. The retainer has an elongated groove formed on a circumferential portion of the retainer in such a manner that the groove extends in the circumferential direction and inclines in the axial direction. The retainer is united with the holder in such a manner that the protrusion is fitted into the elongated groove to thereby enable the retainer to move along the elongated groove in relation to the holder. Rotation of the retainer having an aperture causes the image pickup lens to move along the elongated groove in relation to the holder, thereby moving the image pickup lens axially so as to carry out focus adjustment.

According to the eighth aspect, when the retainer having an aperture stop is rotated, the image pickup lens rotates and moves, since the image pickup lens is united with the retainer. The protrusion formed on the inner cylindrical wall of the holder is fitted into the elongated groove formed on the circumferential portion of the retainer. Accordingly, as the retainer rotates, the protrusion relatively moves along the elongated groove, which inclines in the axial direction of the holder; as a result, the retainer moves axially, and thus the image pickup lens moves axially. The image pickup lens moves rotatively while being accommodated within the holder, thereby maintaining a state in which the image pickup lens is united with the holder. Through axial movement of the image pickup lens, the image pickup lens is focused.

A ninth aspect of the present invention provides an image pickup lens unit comprising, as viewed from an object side, a retainer having an aperture stop and assuming a circular cross section, an image pickup lens assuming a circular cross section, and a holder assuming a circular cross section. The retainer having an aperture stop and the image pickup lens are united with each other. The holder assumes a substantially cylindrical shape in order to accommodate the image pickup lens. The image pickup lens is united with the holder such that the image pickup lens is movable in relation to the holder. An outer circumferential portion of an image-plane-side end portion of the holder is in screw engagement with an inner wall surface of an outer sleeve connected to a main body to which the image pickup lens unit is attached and having a diameter greater than that of the holder. Focus adjustment is performed through at least one of operation of rotating the retainer having an aperture to thereby move the image pickup lens relative to the holder and operation of rotating the holder relative to the outer sleeve.

According to the, ninth aspect of the present invention, when the retainer having an aperture stop is rotated, the image pickup lens united with the retainer is moved. At this time, the image pickup lens moves while being accommodated within the holder, thereby maintaining a state in which the image pickup lens is united with the holder. Through axial movement of the image pickup lens, focus adjustment is performed. Moreover, the outer circumference of the image-plane-side end portion of the holder is in screw engagement with an inner wall surface of the outer sleeve connected to a main body to which the image pickup lens unit is attached and having a diameter greater than that of the holder. Therefore, when the holder is rotated relative to the outer sleeve, the entire holder including the image pickup lens moves axially, whereby focus adjustment is performed. Therefore, focus adjustment can be performed through performance at least one of the above-described two methods.

A tenth aspect of the present invention provides an image pickup lens unit comprising, as viewed from an object side, an image pickup lens assuming a circular cross section and a holder assuming a circular cross section. A surface of the image pickup lens which faces an object, a surface of the image pickup lens which faces an image plane, or both of the surfaces are subjected to printing at a peripheral portion(s) of the image pickup lens so as to form an aperture stop. The holder assumes a substantially cylindrical shape in order to accommodate the image pickup lens. The image pickup lens is united with the holder such that the image pickup lens is movable in relation to the holder. An outer circumferential portion of an image-plane-side end portion of the holder is in screw engagement with an inner wall surface of an outer sleeve connected to a main body to which the image pickup lens unit is attached and having a diameter greater than that of the holder. Focus adjustment is performed through at least one of operation of rotating the image pickup lens to thereby move the image pickup lens relative to the holder and operation of rotating the holder relative to the outer sleeve.

According the tenth aspect of the present invention, when the image pickup lens is rotated, the image pickup lens is moved axially. At this time, the image pickup lens moves while being accommodated within the holder, thereby maintaining a state in which the image pickup lens is united with the holder. Through axial movement of the image pickup lens, focus adjustment is performed. Moreover, the outer circumference of the image-plane-side end portion of the holder is in screw engagement with an inner wall surface of the outer sleeve connected to a main body to which the image pickup lens unit is attached and having a diameter greater than that of the holder. Therefore, when the holder is rotated relative to the outer sleeve, the entire holder including the image pickup lens moves axially, whereby focus adjustment is performed. Therefore, focus adjustment can be performed through performance at least one of the above-described two methods.

An eleventh aspect of the present invention provides an image pickup lens unit comprising, as viewed from an object side, an image pickup lens assuming a circular cross section and a holder assuming a circular cross section. The holder assumes a substantially cylindrical shape and is formed integrally with the image pickup lens in a state in which the image pickup lens is accommodated within the holder. An outer circumferential portion of an image-plane-side end portion of the holder is in screw engagement with an inner wall surface of an outer sleeve connected to a main body to which the image pickup lens unit is attached and having a diameter greater than that of the holder. Focus adjustment is performed through operation of rotating the holder relative to the outer sleeve.

According to the eleventh aspect of the present invention, since the image pickup lens is formed integrally with the holder, when the holder is moved, the image pickup lens is moved together with the holder. The outer circumference of the image-plane-side end portion of the holder is in screw engagement with an inner wall surface of the outer sleeve connected to a main body to which the image pickup lens unit is attached and having a diameter greater than that of the holder. Therefore, when. the holder is rotated relative to the outer sleeve, the entire holder including the image pickup lens moves axially, whereby focus adjustment is performed.

According to the first aspect, in spite of employment of the unitary lens-and-holder structure, the image pickup lens can be focused through movement thereof. Thus, even when errors in manufacture of components or errors in attachment of a CCD or CMOS are of a large magnitude, the image pickup lens can be focused accordingly after assembly. Therefore, a small-sized, high-performance image pickup lens unit can be obtained. Furthermore, simplified assembly and a reduction in the number of components bring about a reduction in weight and cost and enhance suitability to mass production. Also, accuracy required of components is not very high, thereby reducing the cost of the components. By virtue of a synergetic effect of these affirmative factors, costs are reduced further. Additionally, macrophotographic adjustment is possible, thereby enhancing convenience.

According to the second aspect, in spite of employment of the unitary lens-and-holder structure, the image pickup lens can be readily focused after assembly through rotation of the retainer having an aperture stop. Thus, a high-performance image pickup lens unit can be obtained. Simplified assembly and a reduction in the number of components bring about a reduction in weight and cost and enhance suitability to mass production. Also, accuracy required of components is not very high, thereby reducing the cost of the components. By virtue of a synergetic effect of these affirmative factors, costs are reduced further.

According to the third aspect, in spite of employment of the unitary lens-and-holder structure, the image pickup lens can be readily focused after assembly through rotation thereof. Thus, a high-performance image pickup lens unit can be obtained. Since the retainer having an aperture stop is not employed, the number of components is reduced accordingly. Simplified assembly and a reduction in the number of components bring about a reduction in weight and cost and enhance suitability to mass production. Also, accuracy required of components is not very high, thereby reducing the cost of the components. By virtue of a synergetic effect of these affirmative factors, costs are reduced further.

According to the fourth aspect, in spite of employment of the unitary lens-and-holder structure, the image pickup lens can be readily focused after assembly through rotation of the retainer having an aperture stop. Thus, a high-performance image pickup lens unit can be obtained. Simplified assembly and a reduction in the number of components bring about a reduction in weight and cost and enhance suitability to mass production. Also, accuracy required of components is not very high, thereby reducing the cost of the components. By virtue of a synergetic effect of these affirmative factors, costs are reduced. further. Additionally, the manufacture of the image pickup lens does not involve formation of the protrusion, thereby providing another affirmative factor for further reduction in cost.

According to the fifth aspect, in spite of employment of the unitary lens-and-holder structure, the image pickup lens can be readily focused after assembly through rotation of the retainer having an aperture stop. Thus, a high-performance image pickup lens unit can be obtained. Simplified assembly and a reduction in the number of components bring about a reduction in weight and cost and enhance suitability to mass production. Also, accuracy required of components is not very high, thereby reducing the cost of the components. By virtue of a synergetic effect of these affirmative factors, costs are reduced further.

According to the sixth aspect, in spite of employment of the unitary lens-and-holder structure, the image pickup lens can be readily focused after assembly through rotation of the retainer having an aperture stop. Thus, a high-performance image pickup lens unit can be obtained. Simplified assembly and a reduction in the number of components bring about a reduction in weight and cost and enhance suitability to mass production. Also, accuracy required of components is not very high, thereby reducing the cost of the components. By virtue of a synergetic effect of these affirmative factors, costs are reduced further.

According to the seventh aspect, in spite of employment of the unitary lens-and-holder structure, the image pickup lens can be readily focused after assembly through rotation thereof. Thus, a high-performance image pickup lens unit can be obtained. Since the retainer having an aperture stop is not employed, the number of components is reduced accordingly. Simplified assembly and a reduction in the number of components bring about a reduction in weight and cost and enhance suitability to mass production. Also, accuracy required of components is not very high, thereby reducing the cost of the components. By virtue of a synergetic effect of these affirmative factors, costs are reduced further.

According to the eighth aspect, in spite of employment of the unitary lens-and-holder structure, the image pickup lens can be readily focused after assembly through rotation of the retainer having an aperture stop. Thus, a high-performance image pickup lens unit can be obtained. Simplified assembly and a reduction in the number of components bring about a reduction in weight and cost and enhance suitability to mass production. Also, accuracy required of components is not very high, thereby reducing the cost of the components. By virtue of a synergetic effect of these affirmative factors, costs are reduced further. Additionally, the manufacture of the image pickup lens does not involve formation of the grooves, thereby providing another affirmative factor for further reduction in cost.

According to the ninth aspect, even when manufacturing errors of respective components and an attachment error of a CCD or CMOS element are large, these error can be eliminated through performance of focus adjustment after assembly, so that a compact and high-performance image pickup lens unit can be obtained at low cost. Since the focus adjustment after assembly can be performed by two methods, the focus adjustment can be performed within a widened range. In addition, macro adjustment is possible.

According to the tenth aspect, even when manufacturing errors of respective components and an attachment error of a CCD or CMOS element are large, these error can be eliminated through performance of focus adjustment after assembly, so that a compact and high-performance image pickup lens unit can be obtained at low cost. Since the retainer having an aperture stop is not employed, the number of components is reduced accordingly. Since the focus adjustment after assembly can be performed by two methods, the focus adjustment can be performed within a widened range. In addition, macro adjustment is possible.

According to the eleventh aspect, even when manufacturing errors of respective components and an attachment error of a CCD or CMOS element are large, these error can be eliminated through performance of focus adjustment after assembly, so that a compact and high-performance image pickup lens unit can be obtained at low cost. Since the image pickup lens and the holder can be molded as a single body, the fabrication process can be simplified, the number of parts can be reduced, and the cost can be reduced. In addition, macro adjustment is possible.

BRIEF DESCRIPTION OF THE DRAWINGS

FIGS. 1A through 1D are plan views of the imaging pickup lens unit according to a first embodiment of the present invention and components of the image pickup lens, FIG. 1E is a longitudinal sectional view taken along lines 1E and 1E of FIG. 1A, FIG. 1F is a longitudinal sectional view taken along lines 1F and 1F of FIG. 1B, FIG. 1G is a longitudinal side view of FIG. 1C, FIG. 1H is a longitudinal sectional view taken along the lines 1H and 1H of FIG. 1D, FIG. 1I is a bottom view of FIG. 1A, FIG. 1J is a bottom view of FIG. 1B, FIG. 1K is a bottom view of FIG. 1C, and FIG. 1L is a bottom view of FIG. 1D.

FIGS. 2A through 2C are plan views of the image pickup lens unit according to a second embodiment of the present invention and components of the image pickup lens, FIG. 2D is a longitudinal sectional view taken along the lines 2D and 2D of FIG. 2A, FIG. 2E is a longitudinal side view of FIG. 2B, FIG. 2F is a longitudinal sectional view taken along lines 2F and 2F of FIG. 2C, FIG. 2G is a bottom view of FIG. 2A, FIG. 2H is a bottom view of FIG. 2B, and FIG. 2I is a bottom view of FIG. 2C;

FIGS. 3A through 3D are plan views of the image pickup lens unit according to a third embodiment of the present invention and components of the image pickup lens, FIG. 3E is a longitudinal sectional view taken along lines 3E and 3E of FIG. 3A, FIG. 3F is a longitudinal sectional view taken along the lines 3F and 3F of FIG. 3B, FIG. 3G is a longitudinal side view of FIG. 3C, FIG. 3H is a longitudinal sectional view taken along the lines 3H and 3H of FIG. 3D, FIG. 3I is a bottom view of FIG. 3A, FIG. 3J is a bottom view of FIG. 3B, FIG. 3K is a bottom view of FIG. 3C, and FIG. 3L is a bottom view of FIG. 3D.

FIGS. 4A through 4D are plan views of the image pickup lens according to a fourth embodiment of the present invention and components of the image pickup lens, FIG. 4E is a longitudinal sectional view taken along the lines 4E and 4E of FIG. 4A, FIG. 4F is a longitudinal sectional view taken along lines 4F and 4F of FIG. 4B, FIG. 4G is a longitudinal side view of FIG. 4C, FIG. 4H is a longitudinal sectional view taken along lines 4H and 4H of FIG. 4D, FIG. 4I is a bottom view of FIG. 4A, FIG. 4J is a bottom view of FIG. 4B, FIG. 4K is a bottom view of FIG. 4C, and FIG. 4L is a bottom view of FIG. 4D.

DESCRIPTION OF THE PREFERRED EMBODIMENTS

Figure 5A:
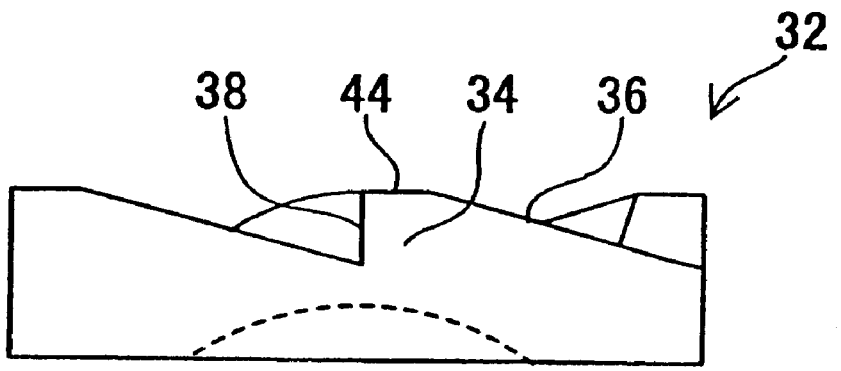
FIG. 5A is an enlarged side view of a second image pickup lens.

Embodiments of the present invention will next be described in detail with reference to the drawings.

Among four embodiments of the present invention, a first embodiment of the present invention will be described first. FIGS. 1A through 1L show an image pickup lens unit 2 according to the first embodiment. The image pickup lens unit 2 includes a first retainer 4 having an aperture stop, a first image pickup lens 6, and a holder 8.

The first retainer 4 assumes a circular cross section. A stop is formed at a central portion of the first retainer 4 such that the diameter reduces stepwise in the axial direction from the object side toward the image plane side. An object-side end portion of the first retainer 4 assumes the form of a flange. Two thin columnar leg portions 10 project from the image plane side of the first retainer 4 at symmetrically opposite positions.

The first image pickup lens 6 assumes a circular cross section. Three first ribs 16, each assuming the form of a hemisphere, project for the circumference of the first image pickup lens 6 in such a manner as to be arranged 120 degrees apart from one another. Two hole portions 12 are formed on the object side of the first image pickup lens 6 at symmetrically opposite positions. The leg portions 10 are press fitted into the corresponding hole portions 12 to thereby unite the first retainer 4 and the first image pickup lens 6. Alternatively, in place of press-fit engagement, the leg portions 10 may be loosely fitted into the corresponding hole portions 12, followed by bonding. In this case, the diameter of the leg portions 10 is reduced to allow a loose fit. Through unified engagement of the first retainer 4 and the first image pickup lens 6, rotation of the first retainer 4 causes the first image pickup lens 6 to rotate together.

The holder 8 assumes a substantially cylindrical shape such that the image-plane-side end portion thereof assumes an outside and an inside diameter greater than those of the remaining portion thereof. A rest portion 14 is formed annularly on the inner cylindrical wall of the holder 8 near the object-side end of the holder 8. The rest portion 14 serves as a stopper for the first image pickup lens 6. Three adjustment grooves 18 are formed at equal spacings on a portion of the cylindrical wall of the holder 8 located between the object-side end and the rest portion 14. Each of the adjustment grooves 18 assumes the form of a gentle, stepwise, spiral. The longitudinal sectional view of FIG. 1 shows the adjustment groove 18 located on the far side of the sectional plane. The holder 8 accommodates the first image pickup lens 6 in a portion thereof extending between the object-side end and the rest portion 14. The image-plane-side surface of the first image pickup lens 6 comes into contact with the rest portion 14 upon maximum retraction of the image pickup lens 6. The first image pickup lens 6 is accommodated in the holder 8 such that the three first ribs 16 of the first image pickup lens 6 are fitted into the corresponding adjustment grooves 18. As the first image pickup lens 6 is rotated, the first ribs 16 move along the corresponding adjustment grooves 18. Since the adjustment grooves 18 each assume the form of a gentle, stepwise, spiral, movement of the first ribs 16 along the corresponding adjustment grooves 18 causes the first image pickup lens 6 to move in the axial direction of the holder 8 (in the axial direction of the first image pickup lens 6), whereby the first image pickup lens 6 can be focused.

In a mass production line, after the first retainer 4, the first image pickup lens 6, and the holder 8 are assembled into the above-described structure, the first retainer 4 is rotated slightly so as to focus the first image pickup lens 6 in an inspection-adjustment step, which is performed through observation of a monitored image. If needed, after the first image pickup lens 6 is focused, the first image pickup lens 6 and the holder 8 are bonded together. When a macrophotographic function is to be imparted to the image pickup lens unit 2, the first image pickup lens 6 and the holder 8 are not bonded, so that macrophotography is possible through rotation of the first retainer 4.

A second embodiment of the present invention will next be described. FIGS. 2A through 2I show an image pickup lens unit 52 according to the second embodiment. The image pickup lens unit 52 includes a first image pickup lens 6 and a holder 8. In place of a retainer having an aperture stop, the image pickup lens unit 52 employs a focusing/macrophotographic adjustment knob 20. Also, the object-side surface of the first image pickup lens 6 is subjected to printing at a peripheral portion thereof so as to form an aperture stop.

The focusing/macrophotographic adjustment knob 20 assumes the form of an crescent and includes a handle 22 projecting from the center of the crescent form. Leg portions 24 project from the corresponding end portions of the crescent form toward the image plane.

The first image pickup lens 6 assumes a circular cross section. Three first ribs 16, each assuming the form of a hemisphere, project from the circumference of the first image pickup lens 6 in such a manner as to be arranged 120 degrees apart from one another. The object-side surface of the first image pickup lens 6 is subjected to printing in black at a peripheral portion thereof so as to form an aperture stop. Only light impinging-on an effective surface corresponding to the aperture stop is allowed to pass through the first image pickup lens 6. Two hole portions 12 are formed on the object side of the first image pickup lens 6 at symmetrically opposite positions. The leg portions 24 are press fitted into the hole portions 12 to thereby unite the focusing/macrophotographic adjustment knob 20 and the first image pickup lens 6. Alternatively, in place of press-fit engagement, the leg portions 24 may be loosely fitted into the hole portions 12, followed by bonding. In this case, the diameter of the leg portions 24 is reduced to allow a loose fit. Through unified engagement of the focusing/macrophotographic adjustment knob 20 and the first image pickup lens 6, rotation of the focusing/macrophotographic adjustment knob 20 causes the first image pickup lens 6 to rotate together.

Since the holder 8 assumes the same structure as that of the holder 8 of the first embodiment, further description of the structure of the holder 8 is omitted here. As in the case of the first embodiment, the holder 8 accommodates the first image pickup lens 6 in a portion thereof extending between the object-side end and the rest portion 14. The image-plane-side surface of the first image pickup lens 6 comes into contact with the rest portion 14 upon maximum retraction of the image pickup lens 6. The first image pickup lens 6 is accommodated in the holder 8 such that the three first ribs 16 of the first image pickup lens 6 are fitted into the corresponding adjustment grooves 18. As the first image pickup lens 6 is rotated, the first ribs 16 move along the corresponding adjustment grooves 18. Since the adjustment grooves 18 each assume the form of a gentle, stepwise, spiral, movement of the first ribs 16 along the corresponding adjustment grooves 18 causes the first image pickup lens 6 to move in the axial direction of the holder 8 (in the axial direction of the first image pickup lens 6), whereby the first image pickup lens 6 can be focused.

In a mass production line, after the focusing/macrophotographic adjustment knob 20, the first image pickup lens 6, and the holder 8 are assembled into the above-described structure, the focusing/macrophotographic adjustment knob 20 is rotated slightly so as to focus the first image pickup lens 6 in an inspection-adjustment step, which is performed through observation of a monitored image. If needed, after the first image pickup lens 6 is focused, the first image pickup lens 6 and the holder 8 are rigidly bonded. When a macrophotographic function is to be imparted to the image pickup lens unit 52, the first image pickup lens 6 and the holder 8 are not bonded, so that macrophotography is possible through rotation of the focusing/macrophotographic adjustment knob 20. When the image pickup lens unit 52 is to be used as a fixed-focus lens unit, the focusing/macrophotographic adjustment knob 20 is removed, and the first image pickup lens 6 and the holder 8 are rigidly bonded.

Next, a third embodiment of the present invention will be described. FIGS. 3A through 3L show an image pickup lens unit 54 according to the third embodiment. The image pickup lens unit 54 includes a focusing/macrophotographic adjustment knob 20, a second retainer 28 having an aperture stop, a first image pickup lens 6, and a holder 8.

The focusing/macrophotographic adjustment knob 20 assumes the form of a crescent and includes a handle 22 projecting from the center of the crescent form. Leg portions 24 project from the corresponding end portions of the crescent form toward the image plane.

The second retainer 28 assumes a circular cross section. A stop is formed at a central portion of the second retainer 28 such that diameter reduces stepwise in the axial direction from the object side toward the image plane side. Two thin columnar protrusions 31 project from the image plane side of the second retainer 28 at symmetrically opposite positions. Two second ribs 30, each assuming the form of a hemisphere, project from the circumference of the second retainer 28 in such a manner as to be arranged 180 degrees apart from each other. Two recesses 29 are formed on the object side of the second retainer 28 at symmetrically opposite positions. The leg portions 24 are press fitted into the corresponding recesses 29 to thereby unite the focusing/macrophotographic adjustment knob 20 and the second retainer 28. Alternatively, in place of press-fit engagement, the leg portions 24 may be loosely fitted into the corresponding recesses 29, followed by bonding. In this case, the diameter of the leg portions 24 is reduced to allow a loose fit. Through unified engagement of the focusing/macrbphotographic adjustment knob 20 and the second retainer 28, rotation of the focusing/macrophotographic adjustment knob 20 causes the second retainer 28 to rotate together.

The first image pickup lens 6 assumes a circular cross section. Two hole portions 12 are formed on the object side of the first image pickup lens 6 at symmetrically opposite positions. The protrusions 31 are press fitted into the corresponding hole portions 12 to thereby unite the second retainer 28 and the first image pickup lens 6. Alternatively, in place of press-fit engagement, the protrusions 31 may be loosely fitted into the corresponding hole portions 12, followed by bonding. In this case, the diameter of the protrusions 31 is reduced to allow a loose fit. Through unified engagement of the second retainer 28 and the first image pickup lens 6, rotation of the second retainer 28 causes the first image pickup lens 6 to rotate together.

The holder 8 assumes a substantially cylindrical shape such that the image-plane-side end portion thereof assumes an outside and an inside diameter greater than those of the remaining portion thereof. A rest portion 14 is formed annularly on the inner cylindrical wall of the holder 8 near the object-side end of the holder 8. The rest portion 14 serves as a stopper for the first image pickup lens 6. Two adjustment grooves 18 are formed at opposite positions on a portion of the cylindrical wall of the holder 8 located between the object-side end and the rest portion 14. As in the case of the first embodiment, each of the adjustment grooves 18 assumes the form of a gentle, stepwise, spiral. The holder 8 accommodates the first image pickup lens 6 in a portion thereof extending between the object-side end and the rest portion 14. The image-plane-side surface of the first image pickup lens 6 comes into contact with the rest portion 14 upon maximum retraction of the image pickup lens 6. The first image pickup lens 6 is accommodated in the holder 8 such that the two second ribs 30 of the second retainer 28 are fitted into the corresponding adjustment grooves 18. As the second retainer 28 is rotated, the second ribs 30 move along the. corresponding adjustment grooves 18. Since the adjustment grooves 18 each assume the form of a gentle, stepwise, spiral, movement of the second ribs 30 along the corresponding adjustment grooves 18 causes the first image pickup lens 6 to move in the axial direction of the holder 8 (in the axial direction of the first image pickup lens 6), whereby the first image pickup lens 6 can be focused.

In a mass production line, after the second retainer 28, the first image pickup lens 6, and the holder 8 are assembled into the above-described structure, the focusing/macrophotographic adjustment knob 20 is rotated slightly so as to focus the first image pickup lens 6 in an inspection-adjustment step, which is performed through observation of a monitored image. If needed, after the first image pickup lens 6 is focused, the second retainer 28 and the holder 8 are rigidly bonded. When a macrophotographic function is to be imparted to the image pickup lens unit 54, the second retainer 28 and the holder 8 are not bonded, so that macrophotography is possible through rotation of the focusing/macrophotographic adjustment knob 20. When the image pickup lens unit 54 is to be used as a fixed-focus lens unit, the focusing/macrophotographic adjustment knob 20 is removed, and the second retainer 28 and the holder 8 are rigidly bonded.

A fourth embodiment of the present invention will next be described. FIGS. 4A through 4L show an image pickup lens unit 56 according to the fourth embodiment. The image pickup lens unit 56 includes a third retainer 42 having an aperture stop, a second image pickup lens 32, and a holder 8.

The third retainer 42 assumes a circular cross section. A stop is formed at a central portion of the third retainer 42 such that the diameter reduces stepwise in the axial direction from the object side toward the image plane side. An object-side end portion of the third retainer 42 assumes the form of a flange, so that the remaining portion has an outside diameter substantially equal to the inside diameter of the holder 8, which will be described later. Two thin columnar leg portions 10 project from the image plane side of the third retainer 42 at symmetrically opposite positions.

The second image pickup lens 32 assumes a circular cross section. Two hole portions 12 are formed on the object side of the second image pickup lens 32 at symmetrically opposite positions. The leg portions 10 are press fitted into the corresponding hole portions 12 to thereby unite the third retainer 42 and the second image pickup lens 32. Alternatively, in place of press-fit engagement, the leg portions 10 may be loosely fitted into the corresponding hole portions 12, followed by bonding. In this case, the diameter of the leg portions 10 is reduced to allow a loose fit. Through unified engagement of the third retainer 42 and the second image pickup lens 32, rotation of the third retainer 42 causes the second image pickup lens 32 to rotate together.

Figure 5B:
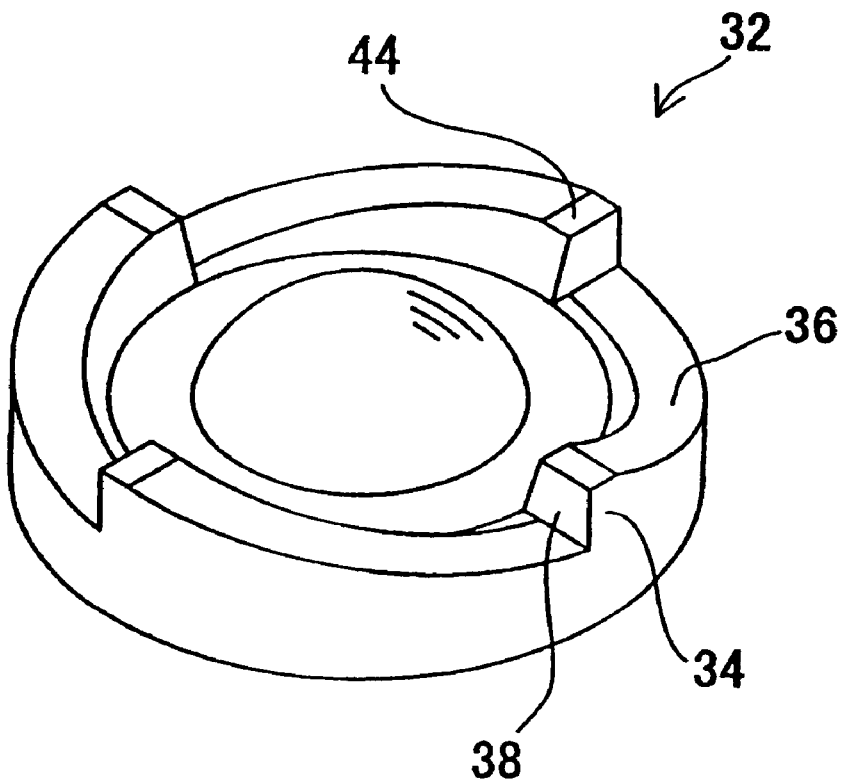
FIG. 5B is a perspective view of the second image pickup lens as viewed from the image plane side.
Figure 6:
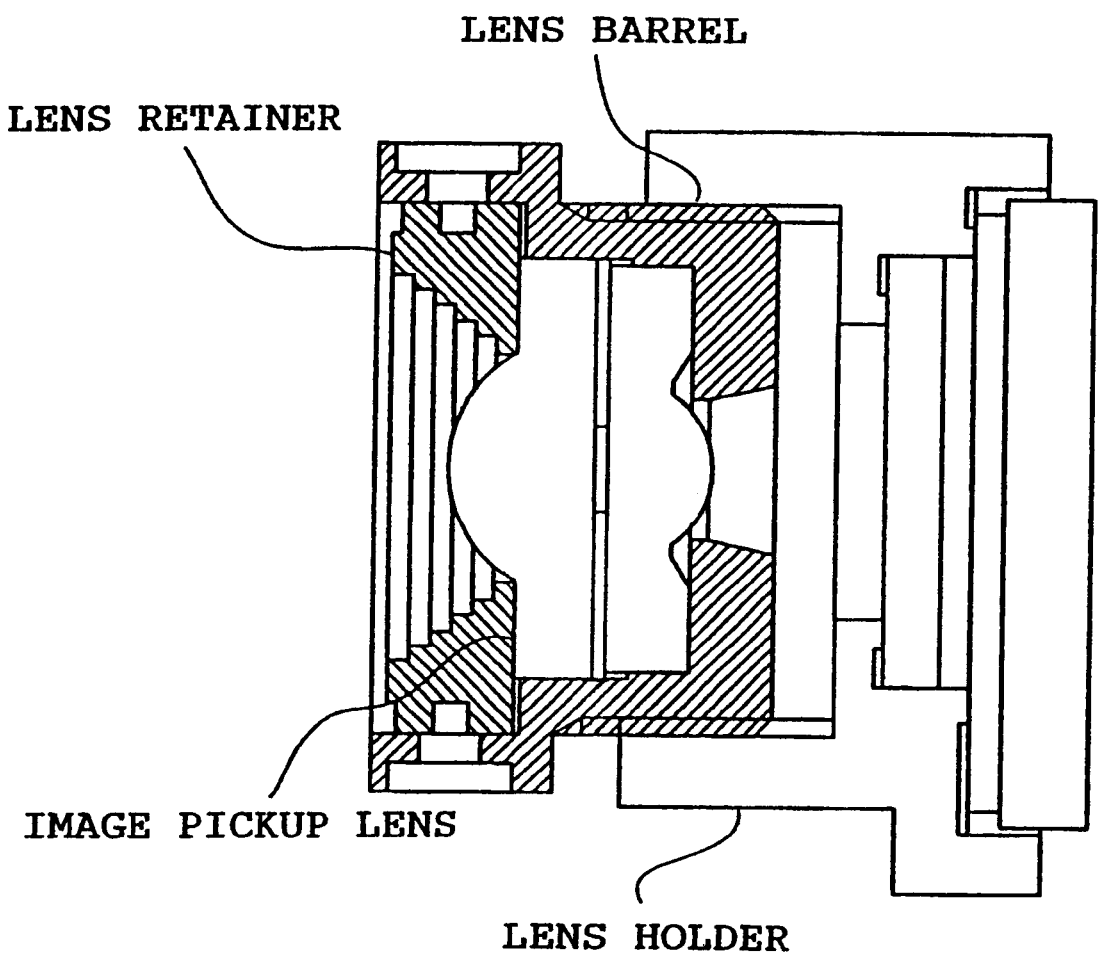
FIG. 6 is a longitudinal, partially sectional view showing a conventional image pickup lens unit for use with a CCD or CMOS.

FIG. 5A is an enlarged side view of the second image pickup lens 32, and FIG. 5B is a perspective view of the second image pickup lens 32 as viewed from the image plane side. Four toothlets 34 are formed annularly every 90 degrees on a peripheral portion of the image-plane-side surface of the image pickup lens 32. The toothlet 34 assumes the form of a substantial sawtooth. The upper face of the toothlet 34 includes a minor horizontal-surface portion 44 and a sloped portion 36, which slopes linearly and is curved along the circumference of the second image pickup lens 32. An upright portion 38 is formed between the horizontal-surface portion 44 and the sloped portion 36 of the adjacent toothlet 34.

The holder 8 assumes a substantially cylindrical shape such that the image-plane-side end portion thereof assumes an outside and an inside diameter greater than those of the remaining portion thereof. A rest portion 14 is formed annularly on the inner cylindrical wall of the holder 8 near the object-side end of the holder 8. Four lens holder ribs 40 are formed at 90-degree intervals on the object side of the rest portion 14 at the boundary between the rest portion 14 and the inner cylindrical wall of the holder 8. The lens retainer rib 40 is a protrusion assuming the form of a small rectangular parallelepiped. The holder 8 accommodates the second image pickup lens 32 in a portion thereof extending between the object-side end and the rest portion 14. The upper faces of the corresponding toothlets 34 of the second image pickup lens 32 are in contact with the lens holder ribs 40, whereby the second image pickup lens 32 are held on the lens holder ribs 40. When the second image pickup lens 32 is rotated, the sloped portions of the corresponding upper faces of the toothlets 34 slide on the corresponding lens holder ribs 40. Since the sloped portions 36 are sloped linearly, sliding of the sloped portions 36 on the corresponding lens holder ribs 40 causes the second image pickup lens 32 to move in the axial direction of the holder 8 (in the axial direction of the second image pickup lens 32), whereby the second image pickup lens 32 can be focused. The present embodiment employs four toothlets 34 and four lens holder ribs 40. The number of the toothlets 34 and the lens holder ribs 40 are not particularly limited, but is preferably two or more. If too many of the toothlets 34 and the lens holder ribs 40 are employed, the rotatable distance becomes too short.

In a mass production line, after the third retainer 42, the second image pickup lens 32, and the holder 8 are assembled into the above-described structure, the third retainer 42 is rotated slightly so as to focus the second image pickup lens 32 in an inspection-adjustment step, which is performed through observation of a monitored image. If needed, after the second image pickup lens 32 is focused, the third retainer 42 and the holder 8 are rigidly bonded. When a macrophotographic function is to be imparted to the image pickup lens unit 56, the third retainer 42 and the holder 8 are not bonded, so that macrophotography is possible through rotation of the third retainer 42. When the image pickup lens unit 56 is to be used as a fixed-focus lens unit, the third retainer 42 and the holder 8 are rigidly bonded.

According to the above-described first through fourth embodiments, although the image pickup lens unit has a unified lens-and-holder structure, the image pickup lens can be readily focused after assembly through rotation of a retainer having an aperture stop or through rotation of the image pickup lens. Thus, even when. errors in manufacture of components or errors in attachment of a CCD or CMOS are of a large magnitude, the image pickup lens can still be focused accordingly. Therefore, a high-quality image pickup lens unit can be provided. Also, since there is no need to pursue extremely high accuracy with respect to components, the cost of components can be held down to a low level.

Modifications of the above-described first, second, and third embodiments will now be described as fifth, sixth, and seventh embodiments. The same elements as those in the first, second, and third embodiments are denoted by the same reference numerals; and their repeated descriptions are omitted.

Figure 7A:
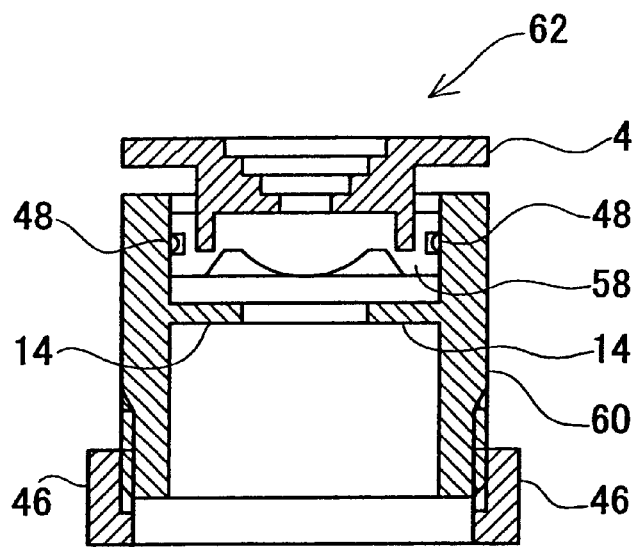
FIG. 7A is a longitudinal sectional view of an image pickup lens unit according to a fifth embodiment of the present invention.
Figure 7B:
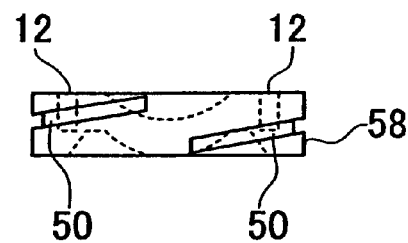
FIG. 7B is a side view of an image pickup lens used in the image pickup lens unit of FIG. 7A.

First, the fifth embodiment of the present invention will be described with reference to FIGS. 7A and 7B, which show an image. pickup lens unit 62 according to the fifth embodiment. The image pickup lens unit 62 includes a first retainer 4 having an aperture stop, a third image pickup lens 58, and a second holder 60.

The third image pickup lens 58 assumes a circular cross section. Two straight grooves 50 are formed on the circumference of the third image pickup lens 58 at opposite sides such that each of the grooves 50 extends in the circumferential direction and inclines at a small angle in the axial direction.

The second holder 60 assumes a cylindrical shape. Two semi-spherical ribs 48 are formed at the same height on the inner wall surface of the second holder 60 located on the object side with respect to a rest portion 14 such that the semi-spherical ribs 48 face each other. An outer circumferential portion of an image-plane-side end portion of the second holder 60 is in screw engagement with the inner wall surface of an end portion of an outer sleeve 46 connected to a main body of a CMOS camera or the like, to which the image pickup lens unit 62 is attached. The outer sleeve 46 has inside and outside diameters greater than those of the second holder 60. Needless to say, outer and inner threads formed on the outer circumference of the second holder 60 and the inner wall surface of the outer sleeve 46, respectively, have inclinations. The outer sleeve 46 may be a part of the main body of the CMOS camera.

When the third image pickup lens 58 is accommodated within the second holder 60, the two ribs 48 of the second holder 60 enter the grooves 50 of the third image pickup lens 58. As the third image pickup lens 58 is rotated, the ribs 48 move relatively along the corresponding grooves 50. Since each of the grooves 50 assumes the form of a straight line inclined at a small angle, movement of the ribs 48 along the corresponding grooves 50 causes the third image pickup lens 58 to move in the axial direction of the second holder 60 (in the axial direction.of the third image pickup lens 58), whereby the third image pickup lens 58 can be focused.

Meanwhile, after completion of assembly, the entirety of the image pickup lens unit 62 can be rotated relative to the outer sleeve 46 in order to move the third image pickup lens 58 in the axial direction of the outer sleeve 46 (in the axial direction of the third image pickup lens 58), whereby the third image pickup lens 58 can be focused.

In a mass production line, after the first retainer 4, the third image pickup lens 58, and the. second holder 60 are assembled into the above-described structure, the first retainer 4 is rotated slightly and/or the second holder 60 is rotated slightly relative to the outer sleeve 46 so as to focus the third image pickup lens 58 in an inspection-adjustment step, which is performed through observation of a monitored image. Since two focus adjustment means are provided, even when a large error exists after assembly, focus adjustment is possible, which is convenient. If necessary, upon completion of focus adjustment, the third image pickup lens 58 and the second holder 60 can be fixed to each other through bonding, and similarly, the second holder 60 and the outer sleeve 46 can be fixed to each other through bonding. When a function of macrophotographing is to be added, the two adjustment means are left unfixed so as to enable macrophotographing, or one of the adjustment means is fixed with the other adjustment means being left unfixed so as to enable macrophotographing.

Figure 8A:
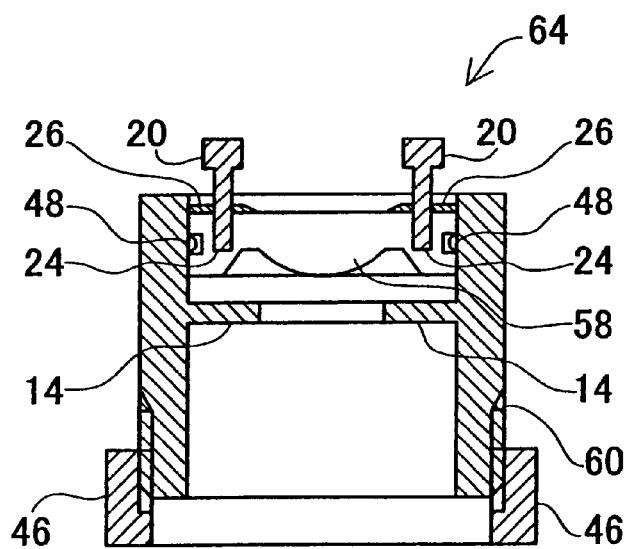
FIG. 8A is a longitudinal sectional view of an image pickup lens unit according to a sixth embodiment of the present invention.
Figure 8B:
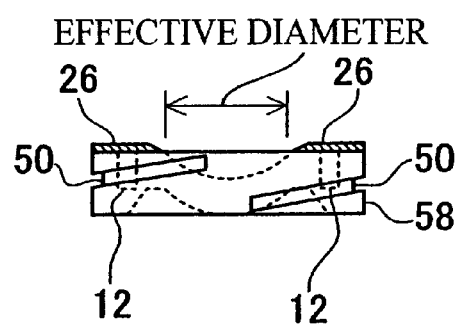
FIG. 8B is a side view of an image pickup lens used in the image pickup lens unit of FIG. 8A.

The sixth embodiment of the present invention will be described with reference to FIGS. 8A and 8B, which show an image pickup lens unit 64 according to the sixth embodiment. The image pickup lens unit 64 includes a focusing/macrophotographic adjustment knob 20, a third image pickup lens 58, and a second holder 60.

The third image pickup lens 58 is subjected to printing in black at a peripheral portion thereof so as to form an aperture stop. Only light impinging on an effective surface corresponding to the aperture stop is allowed to pass through the third image pickup lens 58. The third image pickup lens 58 assumes a circular cross section. Two straight grooves 50 are formed on the circumference of the third image pickup lens 58 at opposite sides such that each of the grooves 50 extends in the circumferential direction and inclines at a small angle in the axial direction.

The second holder 60 assumes a cylindrical shape. Two semi-spherical ribs 48 are formed at the same height on the inner wall surface of the second holder 60 located on the object side with respect to a rest portion 14 such that the semi-spherical ribs 48 face each other. An outer circumferential portion of an image-plane-side end portion of the second holder 60 is in screw engagement with the inner wall surface of an end portion of an outer sleeve 46 connected to a main body of a CMOS camera or the like, to which the image pickup lens unit 64 is attached. The outer sleeve 46 has inside and outside diameters greater than those of the second holder 60. Needless to say, outer and inner threads formed on the outer circumference of the second holder 60 and the inner wall surface of the outer sleeve 46, respectively, have inclinations. The outer sleeve 46 may be a part of the main body of the CMOS camera.

When the third image pickup lens 58 is accommodated within the second holder 60, the two ribs 48 of the second holder 60 enter the grooves 50 of the third image pickup lens 58. As the third image pickup lens 58 is rotated, the ribs 48 move relatively along the corresponding grooves 50. Since each of the grooves 50 assumes the form of a straight line inclined at a small angle, movement of the ribs 48 along the corresponding grooves 50 causes the third image pickup lens 58 to move in the axial direction of the second holder 60 (in the axial direction of the third image pickup lens 58), whereby the third image pickup lens 58 can be focused.

Meanwhile, after completion of assembly, the entirety of the image pickup lens unit 64 can be rotated relative to the outer sleeve 46 in order to move the third image pickup lens 58 in the axial direction of the outer sleeve 46 (in the axial direction of the third image pickup lens 58), whereby the third image pickup lens 58 can be focused.

In a mass production line, after the focusing/macrophotographic adjustment knob 20, the third image pickup lens 58, and the second holder 60 are assembled into the above-described structure, the focusing/macrophotographic adjustment knob 20 is rotated slightly and/or the second holder 60 is rotated slightly relative to the outer sleeve 46 so as to focus the third image pickup lens 58 in an inspection-adjustment step, which is performed through observation of a monitored image. Since two focus adjustment means are provided, even when a large error exists after assembly, focus adjustment is possible, which is convenient. If necessary, upon completion of focus adjustment, the third image pickup lens 58 and the second holder 60 can be fixed to each other through bonding, and similarly, the second holder 60 and the outer sleeve 46 can be fixed to each other through bonding. When a function of macrophotographing is to be added, the two adjustment means are left unfixed so as to enable macro photographing, or one of the adjustment means is fixed with the other adjustment means being left unfixed so as to enable macrophotographing. When the image pickup lens unit 64 according to the present embodiment is used as a fixed-focus lens unit, after the focusing/macrophotographic adjustment knob 20 is removed, the third image pickup lens 58 and the second holder 60 are bonded to each other, and the second holder 60 and the outer sleeve 46 are bonded to each other to complete the lens unit.

Figure 9A:
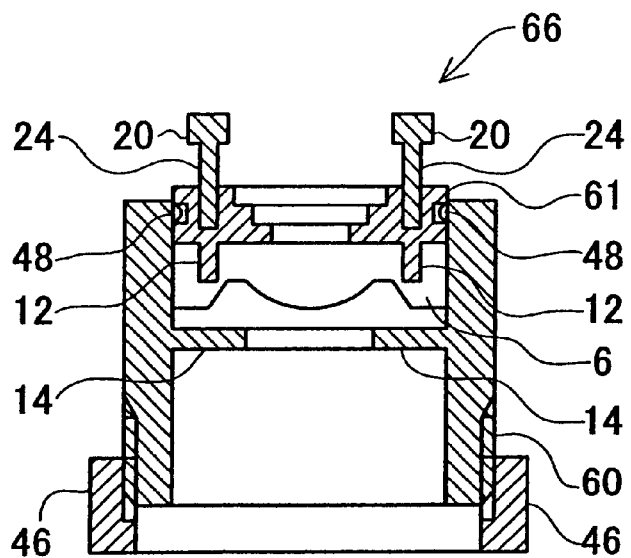
FIG. 9A is a longitudinal sectional view of an image pickup lens unit according to a seven embodiment of the present invention.
Figure 9B:
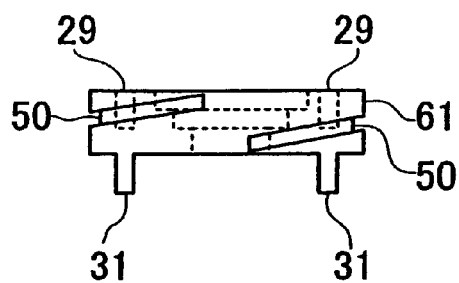
FIG. 9B is a side view of a retainer having an aperture stop used in the image pickup lens unit of FIG. 9A.

The seventh embodiment will be described with reference to FIGS. 9A and 9B, which show an image pickup lens unit 66 according to the seventh embodiment. The image pickup lens unit 66 includes a focusing/macrophotographic adjustment knob 20, a fourth retainer 61 having an aperture stop, a first image pickup lens 6, and a second holder 60.

The fourth retainer 61 assumes a circular cross section. A stop is formed at a central portion of the fourth retainer 61 such that the diameter reduces stepwise in the axial direction from the object side toward the image plane side. Two thin columnar leg portions 31 project from the image plane side of the fourth retainer 61 at symmetrically opposite positions.

Two straight grooves 50 are formed on the outer circumference of the fourth retainer 61 at opposite sides such that each of the grooves 50 extends in the circumferential direction and inclines at a small angle in the axial direction. Two recesses 29 are formed on the object side of the fourth retainer 61 at symmetrically opposite positions. The leg portions 24 are press fitted into the corresponding recesses 29 to thereby unite the focusing/macrophotographic adjustment knob 20 and the fourth retainer 61. Alternatively, in place of press-fit engagement, the leg portions 24 may be loosely fitted into the corresponding recesses 29, followed by bonding. In this case, the diameter of the leg portions 24 is reduced to allow a loose fit. Through unified engagement of the focusing/macrophotographic adjustment knob 20 and the fourth retainer 61, rotation of the focusing/macrophotographic adjustment knob 20 causes the fourth retainer 61 to rotate together with the focusing/macrophotographic adjustment knob 20.

The first image pickup lens 6 has the same configuration as that of the first image pickup lens 6 used in the third embodiment and is united with the fourth retainer 61. Therefore, rotation of the fourth retainer 61 causes the first image pickup lens 6 to rotate together with the fourth retainer 61.

The second holder 60 assumes a cylindrical shape. Two semi-spherical ribs 48 are formed at the same height on the inner wall surface of the second holder 60 located on the object side with respect to a rest portion 14 such that the semi-spherical ribs 48 face each other. An outer circumferential portion of an image-plane-side end portion of the second holder 60 is in screw engagement with the inner wall surface of an outer sleeve 46 connected to a main body of a CMOS camera or the like, to which the image pickup lens unit 66 is attached. The outer sleeve 46 has inside and outside diameters greater than those of the second holder 60.

Needless to say, outer and inner threads formed on the outer circumference of the second holder 60 and the inner circumference of the outer sleeve 46, respectively, have inclinations. The outer sleeve 46 may be a part of the main body of the CMOS camera.

The second holder 60 accommodates the first image pickup lens 6 in a portion thereof extending between the object-side end and the rest portion 14. Upon maximum retraction of the image pickup lens 6, the image-plane-side surface thereof comes into contact with the rest portion 14. The first image pickup lens 6 is accommodated in the second holder 60 such that the two ribs 48 of the second holder 60 enter the grooves 50 of the fourth retainer 61. As the fourth retainer 61 is rotated, the ribs 48 move relatively along the corresponding grooves 50. Since each of the grooves 50 assumes the form of a straight line inclined at a small angle, movement of the ribs 48 along the corresponding grooves 50 causes the first image pickup lens 6 to move in the axial direction of the second holder 60 (in the axial direction of the first image pickup lens 6), whereby the first image pickup lens 6 can be focused.

Meanwhile, after completion of assembly, the entirety of the image pickup lens unit 66 can be rotated relative to the outer sleeve 46 in order to move the first image pickup lens 6 in the axial direction of the outer sleeve 46 (in the axial direction of the first image pickup lens 6), whereby the first image pickup lens 6 can be focused.

In a mass production line, after the fourth retainer 61, the first image pickup lens 6, and the second holder 60 are assembled into the above-described structure, the focusing/macrophotographic adjustment knob 20 is rotated slightly and/or the second holder 60 is rotated slightly relative to the outer sleeve 46 so as to focus the first image pickup lens 6 in an inspection-adjustment step, which is performed through observation of a monitored image. Since two focus adjustment means are provided, even when a large error exists after assembly, focus adjustment is possible, which is convenient.

If necessary, upon completion of focus adjustment, the fourth retainer 61 and the second holder 60 can be fixed to each other through bonding, and similarly, the second holder 60 and the outer sleeve 46 can be fixed to each other through bonding. When a function of macrophotographing is to be added, the two adjustment means are left unfixed so as to enable macrophotographing, or one of the adjustment means is fixed with the other adjustment means being left unfixed so as to enable macrophotographing. When the image pickup lens unit 66 according to the present embodiment is used as a fixed-focus lens unit, after focusing/macrophotographic adjustment knob 20 is removed, the fourth retainer 61 and the second holder 60 are bonded to each other, and the second holder 60 and the outer sleeve 46 are bonded to each other to thereby complete the lens unit.

Although not shown in the drawings, the above-described fourth embodiment may be modified as follows. The holder 8 is formed in a cylindrical shape; and the outer circumference of the image-plane-side end portion of the holder 8 is screw-engaged with the inner circumference of the object-side end portion of the outer sleeve 46. In this case, focus adjustment can be performed through rotation of the holder 8 relative to the outer sleeve 46.

Figure 10:
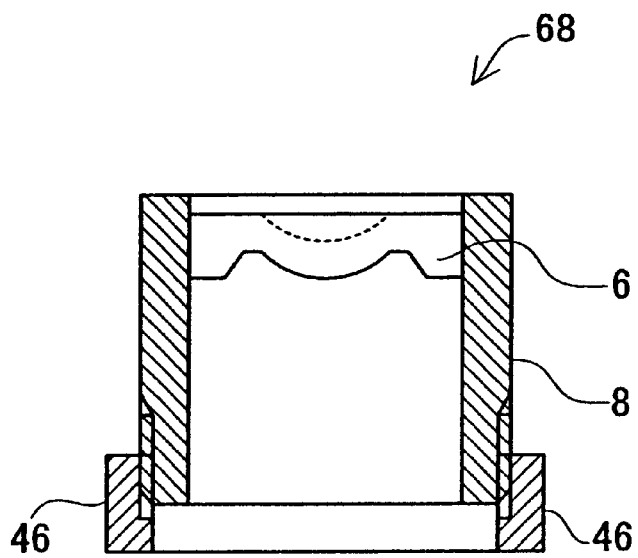
FIG. 10 is a longitudinal sectional view of an image pickup lens unit according to an eighth embodiment of the present invention.

The eighth embodiment will be described with reference to FIG. 10, which shows an image pickup lens unit 68 according to the eighth embodiment. The image pickup lens unit 68 includes a first image pickup lens 6 and a holder 8.

The first image pickup lens 6 assumes a circular cross section. The holder 8 assumes a cylindrical shape. The first image pickup lens 6 and the holder 8 are formed integrally such that the first image pickup lens 6 is located in the vicinity of the object-side end portion of the holder 8. The first image pickup lens 6 and the holder 8 may be made of the same material or of different materials. In general, the first image pickup lens 6 is transparent, and the holder 8 is black.

The outer circumference of an image-plane-side end portion of the holder 8 is in screw engagement with the inner wall surface of an outer sleeve 46 connected to a main body of a CMOS camera or the like, to which the image pickup lens unit 68 is attached. The outer sleeve 46 has inside and outside diameters greater than those of the holder 8. Needless to say, outer and inner threads formed on the outer circumference of the second holder 60 and the inner circumference of the outer sleeve 46, respectively, have inclinations. The outer sleeve 46 may be a part of the main body of the CMOS camera.

Meanwhile, after the image pickup lens unit 68 is fitted into the outer sleeve 46, the image pickup lens unit 68 can be rotated relative to the outer sleeve 46 in order to move the first image pickup lens 6 in the axial direction of the outer sleeve 46 (in the axial direction of the first image pickup lens 6), whereby the first image pickup lens 6 can be focused.

In a mass production line, after the first image pickup lens 6 and the holder 8 are assembled into the above-described structure, the holder 8 is rotated slightly relative to the outer sleeve 46 so as to focus the first image pickup lens 6 in an inspection-adjustment step, which is performed through observation of a monitored image.

If necessary, upon completion of focus adjustment, the holder 8 and the outer sleeve 46 can be fixed to each other through bonding. When a function of macrophotographing is to be added, the adjustment means is left unfixed so as to enable macrophotographing through rotation of the holder 8. When the image pickup lens unit 68 according to the present embodiment is used as a fixed-focus lens unit, the holder 8 and the outer sleeve 46 are bonded to each other to thereby complete the lens unit.

According to the above-described fifth through eighth embodiments, although the image pickup lens unit has a unified lens-and-holder structure, the image pickup lens can be readily focused after assembly. Thus, even when errors in manufacture of components or errors in attachment of a CCD or CMOS are of a large magnitude, the image pickup lens can still be focused accordingly. Therefore, a high-quality image pickup lens unit can be provided. Also, since there is no need to pursue extremely high accuracy with respect to components, the cost of components can be held down to a low level.

What is claimed is:

1. An image pickup lens unit comprising, as viewed from an object side:

a retainer having an aperture stop and assuming a circular cross section;

an image pickup lens assuming a circular cross section; and a holder assuming a circular cross section, wherein said retainer having an aperture stop and said image pickup lens are united with each other;

said holder assumes a substantially cylindrical shape in order to accommodate said image pickup lens and has at least one protrusion formed on an inner cylindrical wall of said holder;

said image pickup lens has an elongated groove formed on a circumferential portion of said image pickup lens in such a manner that the groove extends in the circumferential direction and inclines in the axial direction; and said image pickup lens is united with said holder in such a manner that the protrusion is fitted into the elongated groove to thereby enable said image pickup lens to move along the elongated groove in relation to said holder, whereby rotation of said retainer having an aperture causes said image pickup lens to move along the elongated groove in relation to said holder, thereby moving said image pickup lens axially so as to carry out focus adjustment.

2. An image pickup lens unit according to claim 1, wherein two or three said protrusions and two or three said elongated grooves are provided.

3. An image pickup lens unit according to claim 1, wherein said protrusion assumes the form of a hemisphere.

* * * * *